R. W. DAVIS, Jr.
MANUFACTURE OF ALKALI EARTH NITRATES AND HYDROGEN SULFID.
APPLICATION FILED DEC. 13, 1916.
1,321,013.
Patented Nov. 4, 1919.
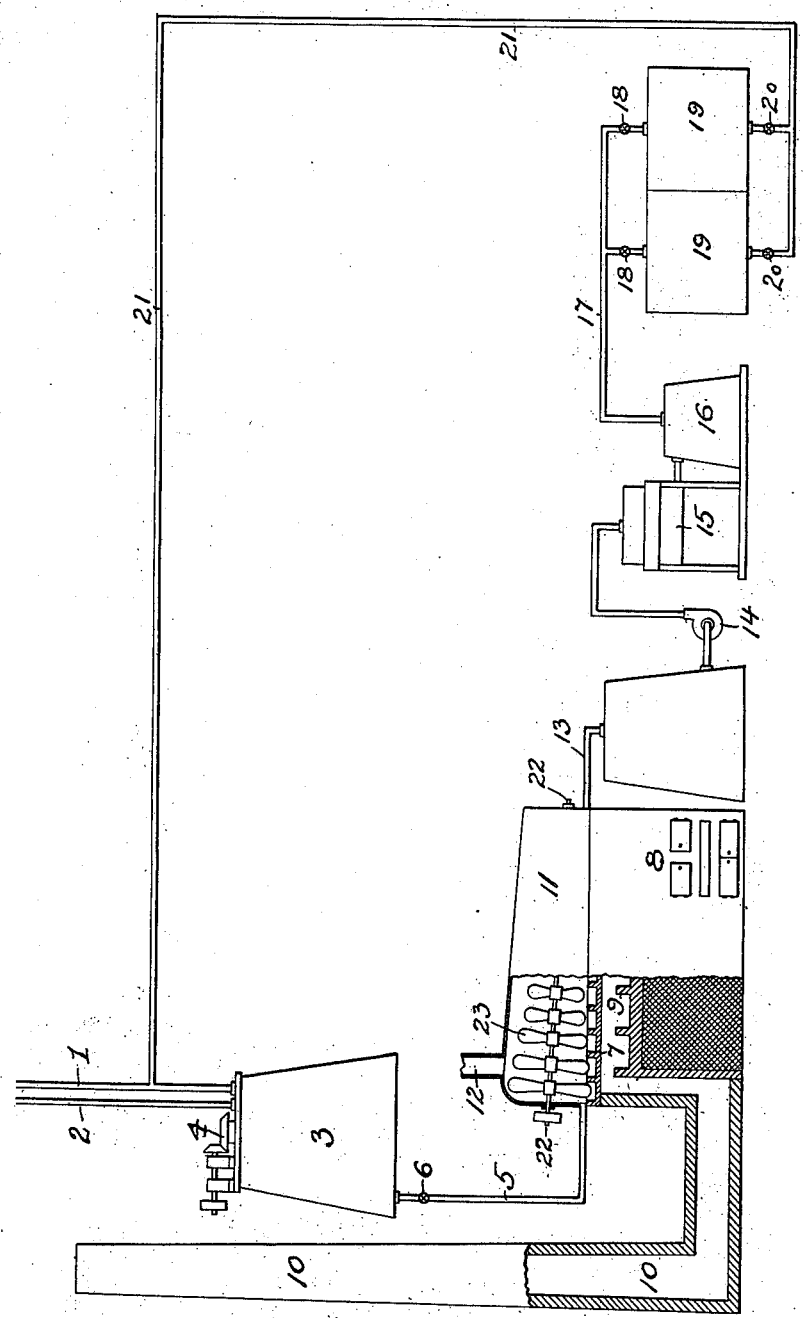
INVENTOR
ROBERT WILLIAM DAVIS, JR.
BY HIS ATTORNEY
Harry Pruitt

UNITED STATES PATENT OFFICE.

ROBERT WILLIAM DAVIS, JR., OF JENKINTOWN, PENNSYLVANIA.

MANUFACTURE OF ALKALI-EARTH NITRATES AND HYDROGEN SULFID.

1,321,013.   Specification of Letters Patent.   Patented Nov. 4, 1919.

Application filed December 13, 1916. Serial No. 136,623.

*To all whom it may concern:*

Be it known that I, ROBERT WILLIAM DAVIS, Jr., a citizen of the United States, residing in Jenkintown, Pennsylvania, have invented certain Improvements in the Manufacture of Alkali-Earth Nitrates and Hydrogen Sulfid, of which the following is a specification.

This invention relates to the manufacture of alkali-earth nitrates directly from alkali-earth sulfids by double-decomposition with a nitrate.

The object of the invention is to provide a direct method of manufacture from alkali-earth sulfids, thereby cheapening the manufacturing cost of the nitrates of the various alkali earths. The object is further to provide means for rendering solutions clean and commercially pure during manufacture, this being accomplished by providing reactions which are satisfactorily complete, thus minimizing both the mother liquor and the impurities in the crystal salt product. Another object is to provide for reaction products which may be cleanly filtered away from the liquor to be crystallized or to provide gaseous reaction products which may be collected and utilized. A further object is to use mildly reactive substances to carry on the reactions, thus permitting the use of ordinary cheap and simple containers.

According to this invention a strong solution of an alkali-earth sulfid, for example, barium sulfid, is prepared in the usual way and a suitable amount of the solution of a nitrate to be described is added to it. The nitrate solution is slightly in excess of that theoretically required for the desired reaction. For example, a suitable nitrate is that of aluminium. The nitrate employed should possess the properties of:— (1) doubly-decomposing with the sulfid, without forming an insoluble sulfid under the conditions of the reaction, (2) decomposing under the conditions of the reaction to form an insoluble hydrate or oxid. Specific nitrates suitable for the reactions are:— (1) aluminium nitrate, (2) magnesium nitrate, (3) chromium nitrate.

In carrying out the invention apparatus of any ordinary form may be used, provided it accomplishes the features of mixing the solutions, boiling the liquor, permitting the escape of the hydrogen sulfid, filtering and crystallizing. One system of apparatus suitable for the process is, in the accompanying drawing, shown in diagrammatic form, partly in elevation and partly in section.

In the drawing, 1 and 2 are, respectively, the pipes for supplying the alkali-earth sulfid solution and the solution of metal nitrate to the mixing tank 3, the latter containing any suitable form of stirring apparatus operated by gearing 4. 5 is a pipe for leading the mixed solutions from the tank 3 through an adjusting cock 6 to the reaction vessel 7 in which the liquor is boiled. 8 is the fire-box of the reaction vessel with deflectors 9 underneath the pan for heat economy, and 10 is the exit flue and stack. 22 is a shaft with paddles 23 attached thereto for the purpose of agitating the liquor during its passage through the reaction vessel in order to more effectually keep the flocculent hydrate in suspension. The boiled liquor flows out from the pan through a pipe 13 into any form of holding tank which delivers the liquor through a pump 14 to a filter-press 15 where the hydrate of aluminium is removed and the solution clarified for crystallization. The filtered liquor passes through a catch tank 16 and thence through a pipe 17 and cocks 18 to crystallizers 19. After crystallization the mother liquor is drawn off through cocks 20 and a pipe 21 and returned by the latter and pipe 1 to the tank 3. A cyclic process is thus established and no solution or salt is wasted. 11 is a hood over the reaction vessel for collecting the hydrogen sulfid gas and 12 is the gas exit for conducting away the gas generated by the reaction.

In the practice of this invention I prefer to effect a thorough mixing of the alkali-earth sulfid solution with the solution of a metal nitrate. This is preferably carried out in a tank located above the reaction vessel so that the combined solution may flow by gravity to the vessel. Of course the mixing may be brought about either previous to the feeding to the reaction vessel, incident to the feeding, or by feeding the two solutions to the reaction vessel separately and effecting the mixing in that vessel. The strength of the solutions will be maintained at approximately the saturation point at 50° C., preferably, although the strength may vary somewhat without interfering seriously with the reaction. The nitrates of aluminium, magnesium or chromium may be used interchangeably, or any two or more of the salts may be used at the same time in any desired proportion.

On mixing the solutions at 50° C., the following reaction probably takes place, although the amount of reaction is optically indeterminate:—

(1) 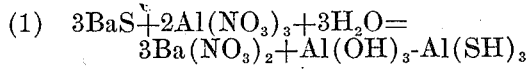
$$3BaS+2Al(NO_3)_3+3H_2O=$$
$$3Ba(NO_3)_2+Al(OH)_3-Al(SH)_3$$

As soon, however, as the solution is introduced into the reaction vessel at a temperature of 80° C. to 100° C., reaction proceeds gradually. The preferred temperature of reaction is from 100–120° C., at which the liquid boils and the reaction is vigorous. The reaction occurring at the preferred temperature is a completion of the above and may be written as follows:—

(2) 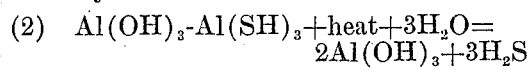
$$Al(OH)_3-Al(SH)_3+heat+3H_2O=$$
$$2Al(OH)_3+3H_2S$$

It will be premised, however, that the spirit of this invention includes the heating in any way and at any temperature that will effect the required reaction for the production of alkali-earth nitrate. The reaction will proceed at a lower temperature than 100° C., under reduced pressure. The sum total of the reaction used as a means for carrying out this invention is then as follows:—

(3) 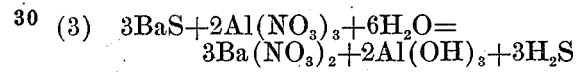
$$3BaS+2Al(NO_3)_3+6H_2O=$$
$$3Ba(NO_3)_2+2Al(OH)_3+3H_2S$$

The solutions may be fed to the reaction vessel and the reaction be completed intermittently, when only a simple one-section reaction vessel is used, or, the solutions may be fed to the reaction vessel continuously, when a vessel is used having partitions or baffle plates to check the flow of the solution from the cooler to the hotter portion of the vessel. This latter is the preferred method of feeding and the discharge in this case is also continuous. I prefer to mechanically agitate the solution during the time of reaction to keep the hydrate in suspension, partly in order that it may easily flow from the reaction vessel with the solution and partly because the hydrate when in suspension acts as a nucleus for the separation of more hydrate and the ready completion of the reaction. When using a trough-like reaction vessel a horizontal shaft provided with radiating paddles serves to produce the required agitation.

The feature of continuous feeding of the mixed solution economizes heat, saves apparatus and provides for a continuous and rather uniform generation of hydrogen sulfid gas. Any of the well known methods may be employed for the utilization of this gas. Practically all of the hydrogen sulfid is rapidly evolved so that there is a ready separation of the gaseous reaction products from the liquid. Collection of the gas is effected by the sheet-metal hood 11 fitted over the reaction vessel. Further handling of the gas may be accomplished by the use of a fan in the flue 12, maintaining the vessel under slightly reduced pressure.

The reaction proceeds smoothly and little or no undecomposed barium sulfid, and only a trace of aluminium nitrate, remains in solution. Ordinarily the solution will remain in the reaction vessel long enough to positively complete the reaction by the absorption of heat, removal of gas, etc., but if an impure alkali-earth nitrate is desired, the reaction need only be approximate, thus leaving some undecomposed barium sulfid in the solution.

The hydrates of the metals whose nitrates are used are all insoluble in the finished liquor and are flocculent and easily filtered, settled or otherwise separated from the discharged solution. If it is desired to save this hydrate for use the solution will be filter-pressed, preferably while in a heated condition, thus preventing premature crystallization and when satisfactorily clear will be conveyed to the crystallizing tanks. The mother liquor from the crystals will contain practically all of the excess nitrate, owing to its greater solubility over the barium nitrate. It may then be returned to the tank 3 and any contained barium nitrate will be crystallized in the succeeding cycle.

The invention is not strictly limited to the nitrates named, nor to completion of reaction, nor to crystallizing the salt produced, since these features are cited more as examples to specify a definite complete process but the intention of the invention is the manufacture of the alkali-earth nitrates as described, and the manufacture of hydrogen sulfid from alkali-earth sulfids by the use of a metal nitrate.

I claim:

1. The method of manufacturing alkali earth nitrate which consists in feeding to a reaction vessel a solution of alkali earth sulfid and a solution of a nitrate of a metal whose hydroxid is insoluble, causing the solutions to react in said vessel, conducting away the gaseous reaction products, separating the soluble and insoluble reaction products, and crystallizing the resultant alkali earth nitrate.

2. The method of manufacturing alkali earth nitrate which consists in feeding to a reaction vessel a solution of alkali earth sulfid and a solution of a nitrate of a metal whose hydroxid is insoluble, causing the solutions to react in said vessel, conducting away the gaseous reaction products, separating the soluble and insoluble reaction products, crystallizing the resultant alkali earth nitrate, and returning the mother liquor to the reaction vessel.

3. The method of manufacturing alkali earth nitrate which consists in mixing in a reaction vessel an alkali earth sulfid solution and a solution of a nitrate of a metal whose hydroxid is insoluble, heating the solution to 100° to 120° C., allowing time for the completion of the reaction, collecting the gases of reaction, discharging the liquid from the reaction vessel, separating the flocculent hydrate from the solution, and crystallizing the alkali earth nitrate from said solution.

4. The method of manufacturing alkali earth nitrate which consists in mixing in a reaction vessel an alkali earth sulfid solution and a solution of a nitrate of a metal whose hydroxid is insoluble, heating the solution to 100° to 120° C., allowing time for the completion of the reaction, collecting the gases of reaction, discharging the liquid from the reaction vessel, separating the alkali hydrate from the solution, crystallizing the alkali earth nitrate from the solution, and returning the mother liquor to the reaction vessel.

5. The method of manufacturing hydrogen sulfid which consists in mixing in a reaction vessel a solution of an alkali earth sulfid and a solution of a nitrate of a metal whose hydroxid is insoluble, boiling the mixed solutions, and collecting the gas emanating therefrom.

In testimony whereof I have signed my name to this specification.

ROBERT WILLIAM DAVIS, Jr.